Nov. 20, 1945.    J. P. COOKE    2,389,184
CLAMPING AND SECURING DEVICE
Filed Dec. 15, 1943    2 Sheets-Sheet 1
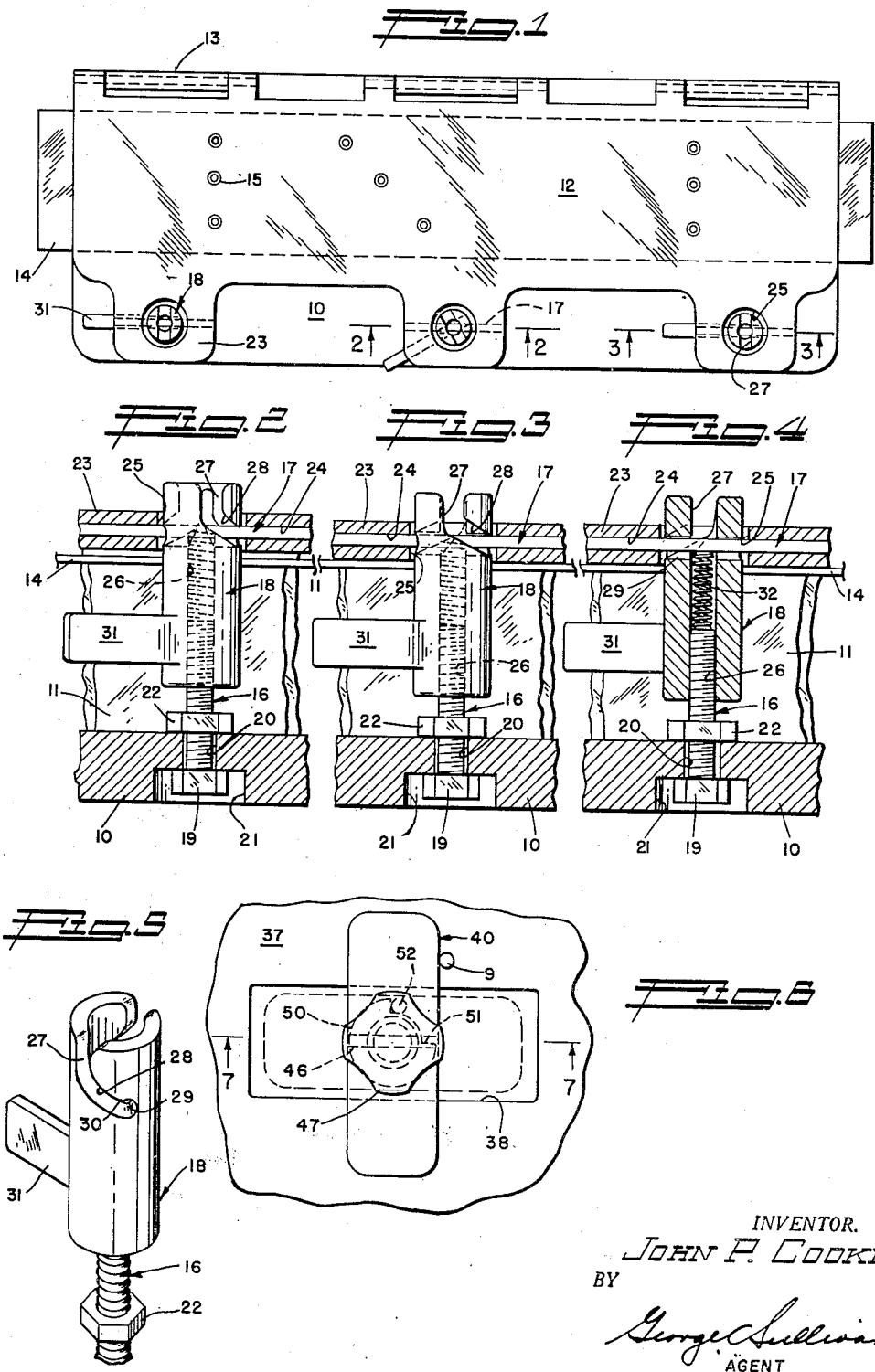
INVENTOR.
JOHN P. COOKE
BY
George C. Sullivan
AGENT

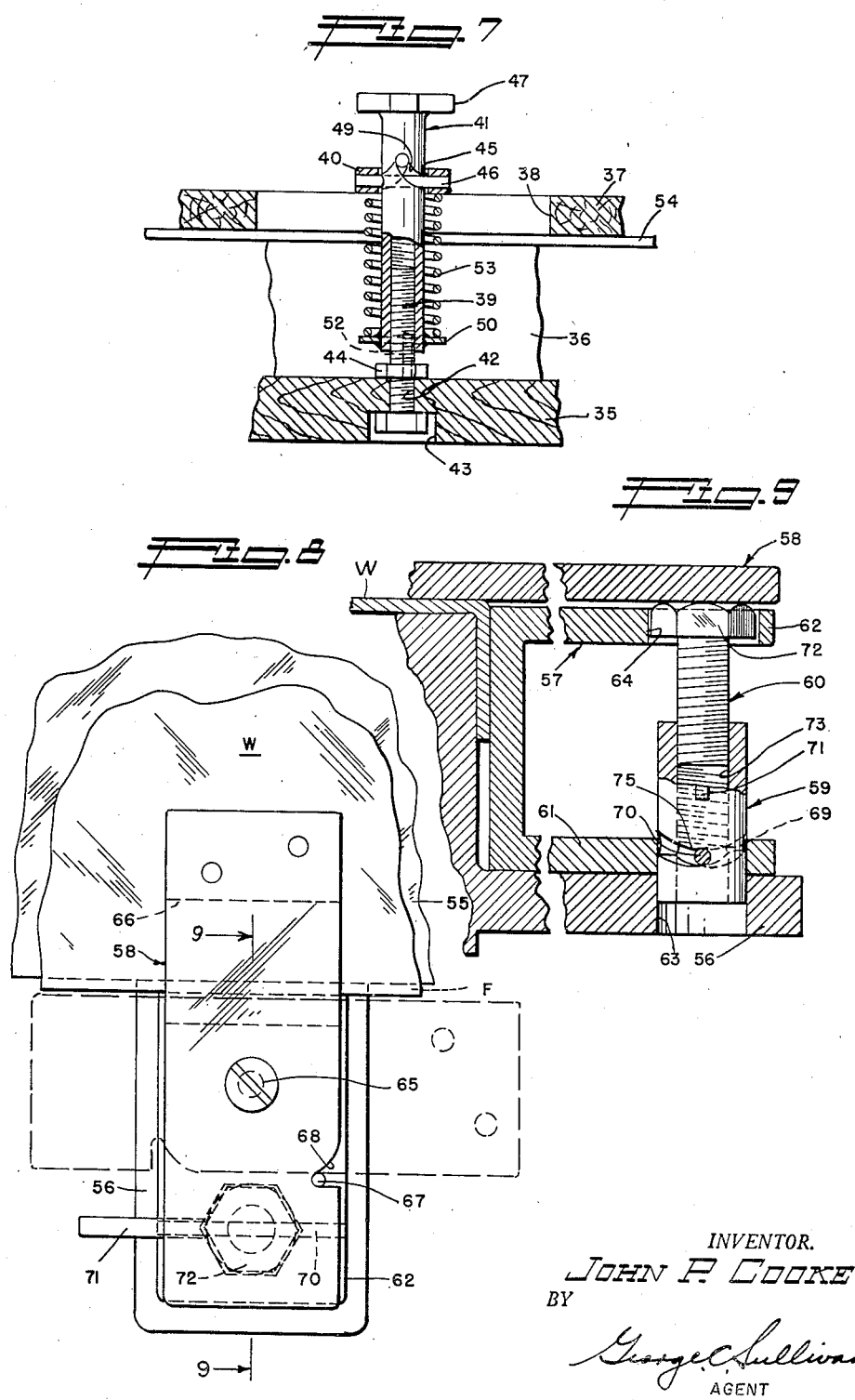

Patented Nov. 20, 1945

2,389,184

UNITED STATES PATENT OFFICE 2,389,184

CLAMPING AND SECURING DEVICE

John P. Cooke, Los Angeles, Calif., assignor to Lockheed Aircraft Corporation, Burbank, Calif., a corporation of California Application December 15, 1943, Serial No. 514,327

15 Claims. (Cl. 10—107)

This invention relates to clamping devices and securing devices useful on jigs, fixtures and other apparatus where clamping, securing and releasable locking effects are required.

The present invention is directed to releasable clamping and securing devices having a wide range of usefulness and suitable for embodiment in tools, mechanisms and apparatus of various characters. I will herein refer to the invention as embodied in devices primarily intended for use on jigs and fixtures, this being merely an illustrative example of the utility of the invention, it being understood that the invention is not to be considered as limited to this particular application or to any other specific use.

In drill jigs and similar jigs and fixtures, it has been the general practice to employ bolts and wing nuts to clamp the work between the elements of the jig. The bolts are usually pivotally secured to the lower plate of the jig by expensive hinge mountings so as to be movable between retracted positions clear of the upper plate and active positions where they engage in slots in the upper plate. When the work and upper plate have been arranged in place, the bolts are swung to their active positions and the wing nuts are screwed down along the bolts to engage the upper plate. Each individual bolt must be brought to the upright position and each individual nut must be screwed down to exert pressure on the upper plate. These operations are tedious and time consuming, and where the jig embodies a large number of bolts, considerable time is required to position the bolts and screw down the nuts. Furthermore, considerable physical effort is required to tighten down the several nuts. It is difficult, if not impossible, to obtain uniform clamping pressure by means of the spaced individual nuts and the work piece is not properly held for the following operation. The projecting bolts, which are often of substantial length, form hazards and interfere with work at the jig or fixture. In the upright active positions the bolts project from the top of the jig to interfere with the drill operations at the jig and when the bolts are in the inactive positions they often project from the sides of the jig.

It is a general object of the present invention to provide a simple, compact and easily operated securing and clamping device. The device of the present invention embodies only one moving part and may be fully operated with a minimum of physical effort to obtain substantial clamping pressure. The invention may be embodied in small compact units that are substantially flush with the top of the jig or fixture and do not project any appreciable distance from the jig at any time.

Another object of the invention is to provide a clamping device that may be quickly operated to apply a predetermined clamping force or pressure. A partial rotation of the handle fully actuates the device to produce a known clamping force. It is unnecessary to bring the device to an operative position and then manipulate nuts, or the like, through several revolutions while attempting to estimate the clamping pressure being obtained.

Another object of the invention is to provide a clamping device that may be readily adjusted to act through any selected range. The device of the invention may be easily adjusted to exert a predetermined clamping force in any selected or required plane which adapts the jig to handle work of different thicknesses. When the device has been adjusted it will thereafter exert a known force in a known plane until again set or adjusted. Where several clamping devices are employed on a jig they may be easily adjusted to exert a given pressure on a jig element occupying a given position so that a uniform clamping action is obtained throughout the jig in all subsequent operations.

A further object of the invention is to provide a clamping device or securing device that is automatically partially operated upon bringing the upper jig plate into place. Following this partial operation it is only necessary to give the handle a slight thrust to complete the clamping operation and to lock the device.

A still further object of the invention is to provide a clamping device of the character referred to that is inexpensive to manufacture and that embodies a minimum number of simple parts.

Other objects and features of the invention will be readily understood from the following detailed description of typical preferred forms of the invention in which reference will be made to the accompanying drawings in which:

Figure 1 is a plan view of a jig embodying one form of clamping device of the invention showing two of the devices fully operated and one of the devices in a partially operated position;

Figure 2 is an enlarged fragmentary vertical detailed sectional view taken substantially as indicated by line 2—2 on Figure 1 showing the cam element in elevation and in the partially operated position;

Figure 3 is a view similar to Figure 2 taken as indicated by line 3—3 on Figure 1 showing the cam element fully actuated;

Figure 4 is a view similar to Figure 3 with the cam element appearing in longitudinal cross section;

Figure 5 is a perspective view of the bolt and cam element of the device of Figures 1 to 4 inclusive;

Figure 6 is a fragmentary plan view illustrating a portion of a jig or fixture embodying another form of clamping device of the invention;

Figure 7 is a fragmentary vertical detailed sectional view taken as indicated by line 7—7 on Figure 6 with a portion of the cam element appearing in side elevation;

Figure 8 is a plan view of still another form of the invention illustrated in connection with a portion of a jig; and Figure 9 is a vertical detailed sectional view taken as indicated by line 9—9 on Figure 8 with a portion of the cam appearing in side elevation.

The simple jig illustrated in Figures 1 to 4 inclusive comprises a lower plate 10, a block 11 secured to the upper side of the plate 10 and an upper plate 12. The upper plate 12 is hinged along its rear edge at 13 to be movable between a raised position and a lowered or operative position. The work piece 14 is placed on the block 11 and the upper plate 12 is swung down to engage the upper face of the work. I have shown spaced sets of bushings 15 provided in the upper plate 12 to receive and guide the drill to produce accurately positioned openings in the work piece 14. A plurality of spaced clamping devices of the invention is provided to clamp the top plate 12 against the work piece 14 for the drilling operation. The several clamping devices may be identical and I will proceed with a detailed description of one device, it being understood that this description is applicable to the other devices.

The form of clamping device of Figures 1 to 5 inclusive may be said to comprise generally a threaded member or a bolt 16 on the plate 10, a pin 17 fixed in the plate 12 and a cam element 18 in threaded engagement with the bolt 16 and cooperable with the pin 17.

The threaded member 16 may be a simple stud or bolt. In practice I may employ a standard or conventional bolt formed at its lower end for ready engagement by a wrench, or the like. In the drawings I have shown the lower end of the bolt 16 provided with a polygonal head 19 for engagement by a wrench, it being understood that the bolt may be equipped with a polygonal socket for wrench engagement. The bolt 16 extends through a vertical opening 20 in the lower plate 10 and the lower portion of the bolt is received in a counterbore 21 with clearance for ready engagement by a wrench. The opening 20 is not threaded and shiftably receives the bolt 16 so that it may be adjusted vertically to change the active position of the cam element 18. A nut 22 is provided on the bolt 16 to cooperate with the upper surface of the plate 10 to lock or set the bolt in its adjusted position. The bolt 16 may be relatively short and need not project beyond the upper face of the block 11. Accordingly, the bolt 16 does not form a hazard or obstruction at the working surface of the block. It is usually preferred to locate the upstanding bolt 16 adjacent an edge of the base plate 10.

The pin 17 is a simple rod or dowel fixed to the upper plate 12 in a position to be engaged by the cam surfaces of the element 18. It is preferred to use a hardened pin 17. Where the bolt 16 is adjacent the edge of the lower plate 10, the upper plate 12 may have a projecting lug 23 on its forward edge and the pin 17 may be arranged in a horizontal opening 24 in the lug to extend diametrically through a vertical opening 25 in the lug. The provision of the lug 23 facilitates the assembling or insertion of the pin. In the construction illustrated, the pin 17 has its longitudinal axis parallel with the forward edge of the top plate 12.

The cam element 18 is in the nature of a tubular barrel or sleeve engaged on the bolt 16. The longitudinal opening 26 of the element 18 has a thread, the lower portion of which mates with the thread of the bolt 16. The element 18 is of sufficient length to have ample threaded engagement with the bolt 16 and to extend a substantial distance upwardly beyond the bolt. The cam element 18 is arranged so that its lower end is clear of the locking nut 22 at all times. The opening 25 in the top plate 12 is proportioned to receive the cam element 18 with suitable clearance when the plate is lowered to its active position. The upper end of the cam element 18 may be flush with or may project slightly beyond the top surface of the plate 12 when the latter is lowered as shown in Figure 2, but never projects a substantial distance beyond either the block 11 or the plate 12.

The upper portion of the element 18 is provided with cam surfaces for engaging with the pin 17. In the preferred construction, bayonet slots or cam slots are formed in the upper portion of the element 18 and their walls present the cam surfaces. There are two like or identical slots which enter the element 18 from its upper end. The upper portions 27 of the slots are substantially vertical and the slots have portions 28 which curve or spiral downwardly and circumferentially from the straight upper portions. The pitched or curved slot portions 28 terminate at what I will term notches 29. The notches 29 leave or provide slightly rounded rises or projections 30 on the upper wall of the slots. The cam slots are proportioned to slidably receive the pin 17 and the notches 29 are adapted to receive and hold the pin to retain the cam element and the pin in the locked relationship. The cam element 18 is preferably case hardened.

A projecting lever or handle 31 is provided on the cam element 18 to facilitate its manual operation. The handle 31 may be a simple rigid part projecting horizontally from the cam element. The handle 31 may be proportioned to extend only a slight distance beyond the plate 10 and lug 23 and is adapted to engage the block 11 to limit turning of the cam element 18 and thus prevent excessive movement or displacement of the element.

In some embodiments or applications of the invention it is desirable to provide spring means for partially supporting the top plate 12 of the jig when the cam element 18 is moved to its released position to permit raising of the top plate. As best illustrated in Figure 4 of the drawings, a helical compression spring 32 may be arranged in the opening 26 of the cam element to rest on the upper end of the bolt 16. The spring 32 is engaged and compressed by the pin 17 when the plate 12 is in the lowered and active positions. When the cam element 18 has been turned to its released position the spring 32 assumes a portion of the weight of the plate 12 so that the engagement of the pin 17 with the pitched walls of the cam slots does not turn the cam element 18 to a position to interfere with free raising of the top plate 12. In jigs where the weight of the top plate 12 is otherwise counter-balanced or assumed the spring 32 may be omitted.

In employing the structure of Figures 1 to 5 inclusive, the bolts 16 of the several clamping devices may first be adjusted to adapt the jig for the handling of the work of a given thickness and to assure the required clamping pressure on the work. The bolts 16 are easily adjusted to bring the cam elements 18 to corresponding vertical positions and thus assure a uniform clamping pressure on the top plate 12, and the bolts may be set in the adjusted positions by the nuts 22. Assuming that the top plate 12 has been raised, the work piece 14 is placed on the block 11 and positioned as required. The plate 12 is then lowered on to the work. If the cam elements 18 are in their idle or inactive positions, as they normally would be with the plate 12 raised, the pins 17 pass downwardly through the vertical portions 27 of the cam slots as the plate 12 approaches the work. As the pins 17 continue downwardly they cooperate with the sloping lower walls of the slot portions 28 and this engagement produces rotation of the elements 18. The direction of pitch of the threads on the bolts 16 and elements 18 is such that this rotation feeds the elements downwardly. Thus the elements 18 are automatically partially rotated and partially operated concurrently with lowering of the plate 12. The lowering of the plate as just described brings the pins 17 into the lower portions of the slots where they are immediately in front of the rises or projections 30. Figure 3 of the drawings illustrates the parts in this position. The operator or workman then merely pushes or partly rotates the handles 31 of the elements 18 to force the rises or projections 30 over the pins 17 and to bring the notches 30 into receiving relation to the pins. This completes the clamping action and locks the clamping devices where they exert a given downward pressure on the plate 12 and work piece 14.

It is an important feature of the invention that the locking of the device is accompanied by a further or final downward movement of the cam element 18 and therefore, additional clamping pressure on the work. The cooperating threads on the bolt 16 and wall of the opening 26 feed the cam element 18 downwardly as the element is turned to the final locking position, and this positive downward movement of the cam element is transmitted through the medium of the pins 17 to the top plate 12 to complete the clamping of the work. Thus the final locking of the device is accompanied by a final clamping action. As distinguished from this prior cam clamping and locking devices of this nature have been constructed so that the clamping pressure is relaxed during the final locking movement and springs are often depended upon to maintain the clamping pressure during such relaxation. In the device of the invention, the final locking movement is positive and no springs are necessary to obtain the final clamping pressure. Thus I have provided an extremely simple compact device easily operated to obtain a positive locked clamping action. When the drilling operation is completed and it is desired to remove the work piece 14 from the jig, the levers 31 of the several clamping devices are merely swung outwardly to turn the cam elements 18 so that the sloping or vertical portions of the cam slots receive the pins 17, and in this way the work is cleared or freed. The plate 12 may be raised to its upright position following the release of the clamp devices.

In Figures 6 and 7, I have illustrated a jig having a base plate 35, a block 36 on the base plate, and a top plate 37 corresponding generally to the plate 10, block 11 and plate 12, respectively, of the previously described jig. The top plate 37 has a slot or opening 38 which is preferably oval or rectangular in plan elevation. The clamp means of Figures 6 and 7 comprises a threaded member or bolt 39, a pressure bar or clamp bar 40 for cooperating with the top plate 37 and a cam element 41 in threaded engagement with the bolt 39 and operatively associated with the bar 40. The bolt 39 may be the same as the above described bolt 16 and is turnably received in a vertical opening 42 in the base plate 35 to have its socketed head in a counterbore 43 and to provide for adjustment of the cam element. A nut 44 is provided on the bolt 39 to engage the upper surface of the plate 35 for locking the bolt in its adjusted position.

The bar 40 is the active clamping element and is provided to apply downward clamping pressure to the top plate 37. The bar 40 is an elongate element of rectangular transverse cross section proportioned to pass freely through the opening 38 when in the position indicated by the broken lines in Figure 6. When turned 90° from the broken line position to the full line position of Figure 6 the bar 40 has substantial end portions positioned to bear downwardly against the plate 37. A vertical opening 45 is provided in the bar 40 intermediate its ends to freely receive the cam element 41. A dowel or pin 46 passes diametrically through the opening 45 to have cooperation with the cam surfaces of the element 41. The ends of the pin 46 may be fixed in a horizontal opening in the bar 40.

The cam element 41 is similar to the above described element 18, being an elongate sleeve whose central longitudinal opening has a thread mating with the thread of the bolt 39. The element 41 is of sufficient length to project upwardly beyond the plate 37 when the latter is in its active position. A suitable knob or handle 47 is provided on the upper end of the element 41 to facilitate manual rotation of the element. Bayonet slots or cam slots 49 are provided in the element 41 some distance below its knob 47. The slots 49 may be substantially identical with the above described cam slots having generally vertical upper portions and curved or sloping intermediate portions terminating at notches leaving slight projections on the upper walls of the slots. The pin 46 of the bar 40 cooperates with the slots 49, being permanently fixed to the bar to remain in the slots at all times.

The invention provides means for limiting turning of the cam element 41. This means may comprise a washer or collar 50 fixed on the lower portion of the element 41 as by welding or other means. A circumferential notch is provided in the periphery of the collar 50 to provide the collar with spaced opposing radial shoulders 51 spaced substantially 90° apart. A stop pin 52 projects upwardly from the base plate 35 and is located to be engaged by the shoulders 51 to limit turning of the cam element 18. The cooperation of the pin 46 with the slots 49 determines the rotative position of the bar 40 so that the cooperation of the shoulders 51 with the pin 52 may automatically locate the bar 40 in its two rotative positions. It is preferred, however, to provide a stop pin 9 on the top plate 37 to be engaged by the bar 40 when the bar reaches its active clamping position. The pin 9 definitely stops the bar 40 in the clamping position so that the final rotary movement of the cam element assures a positive clamping action.

The invention further includes means for urging the bar 40 upwardly to be clear of the top plate 37 during its movement between the two positions illustrated in the full lines and broken lines in Figure 6. This means comprises a helical spring 53 surrounding the cam element 41. The spring 53 is under compression between the under side of the bar 40 and the collar 50 to constantly exert an upward pressure on the bar. It will be seen that when the bar is in the released position illustrated by broken lines in Figure 6 the spring 53 supports the bar 40 in a position where the pin 46 is in the upper ends of the slots 49.

In using the device of Figures 6 and 7 the bar 40 is initially in the position shown by the broken lines in Figure 6 so that the top plate 34 may be lowered against the work piece 54 positioned on the block 36. With the plate 37 in place, the knob 47 is turned to rotate the cam element 41. The engagement of the pin 46 in the generally vertical portions of the slots 49 causes the bar 40 to be turned with the cam element. The initial turning of the cam element moves the bar 40 toward a position where its end portions overlie the plate 37. During this phase of operation the cooperation of the threads on the bolt 39 and element 41 feed the bar downwardly but the bar is not brought into tight engagement with the plate 37 until it approaches the full line position of Figure 6. With continued turning of the cam element 41, the pin 46 cooperates with the sloping walls of the slots 49 to positively force the bar 40 downwardly against the plate to clamp the work piece. The final phase of rotation of the cam element 41 brings the pin 46 into the notches of the slots 49, corresponding to the notches 29, to lock the device. This locking action is accompanied by downward screwing of the element 41 on bolt 39 so that the locking action is effected simultaneously with a final positive clamping of the work piece 54.

When the drilling, routing or punching operation is completed, the knob 47 is rotated to turn the bar 40 to the broken line position of Figure 6. This rotary movement of the bar 40 is accompanied by upward movement of the bar produced by the screw threads, by engagement of the pins 46 with the sloping walls of the cam slots 49 and by the spring 53. Accordingly, there is little resistance to rotation of the bar and it swings free from the top plate 47. The pin 52 engaging a shoulder 51 stops the element 41 in the position where the top plate 37 may be raised without interference from the bar 40. It is to be understood that a multiplicity of the clamping devices may be employed on the fixture or jig and the clamping devices may be arranged as found most desirable.

The jig or fixture of Figures 8 and 9 comprises a block 55 having a vertical forward face and a horizontal top face. A horizontal ledge or shelf 56 projects forwardly from the block 55. The work piece W rests on the top of the block 55 and has a downturned flange F which engages against the forward face of the block.

The clamping device of Figures 8 and 9 includes a bracket or support 57, a clamp lever 58, a cam element 59, and a screw 60 operated by the cam element to actuate the lever 58.

The support 57 may be a generally U shaped part provided with a lower flange 61 which rests on the shelf 56, an upstanding portion in spaced parallel relation with the front face of the block and a top flange 62 projecting forwardly and spaced above the flange 61. The lower flange 61 may be fixed at the shelf 56. A vertical cylindrical opening 63 extends through the shelf 56 and the overlying flange 61 to receive the cam element 59. A polygonal vertical opening 64 is provided in the top flange 62 and is in vertical alignment with the opening 63.

The clamp lever 58 may be a simple generally horizontal member secured to the top flange 62 by a screw or bolt 65 to have limited pivotal movement about a horizontal axis and to be rotatable about a vertical axis. The bolt 65 may be tightened and loosened to adjust the lever 58. The lever 58 is rotatable about its vertical axis to be movable between the active position shown in full lines in Figure 8 and the inactive position illustrated in broken lines in Figure 8. When the lever 58 is in its active position, it has one end portion overlying the opening 64 and its other end portion overlies the edge part of the work piece W. A pad 66 may be provided on the under side of the lever 58 to engage the work piece. A stop pin 67 is provided on the top flange 62 and the lever 58 has a notch 68 for receiving the pin to stop the lever in its active position. The edge of the lever engages the pin 67 to stop the lever in its inactive position illustrated by the broken lines in Figure 8.

The cam element 59 is a tubular barrel or sleeve similar to the element 18 and is provided with a pair of cam slots 69 similar to or identical with the slots 49. The lower part of the cam element 59 is slidable and rotatable in the opening 63 and the slots 69 are within the upper portion of the opening. A dowel or pin 70 is fixed in a horizontal opening in the lower flange 61 and passes diametrically through the opening 63. The pin 70 extends through the two cam slots 69 and remains in the slots at all times. A suitable handle 71 is fixed on the cam element 59 and projects beyond the support 57 so that it is readily accessible for the purpose of rotating the cam element.

The threaded member or bolt 60 serves to pivot the lever 58 about its horizontal axis of movement to cause the lever to clamp the work piece. This embodiment of the invention is characterized by the fact that the threaded member 60 is moved longitudinally by both screw threads and cam means to effect the clamping and securing action. The bolt 60 preferably has a polygonal head 72 on its upper end which conforms to and slidably fits the opening 64 in the top flange 62. This cooperation holds the bolt 60 against rotation while permitting free axial movement of the bolt. A substantial lower portion of the bolt 60 has screw threaded engagement with a thread 73 on the wall of the opening in the tubular cam element 59. Accordingly, rotation of the cam element relative to the bolt results in axial movement of the bolt by a screw thread action. This axial movement of the bolt is accelerated by a cam action which will be later described. The bolt 60 is arranged so that its head 72 always remains in cooperation with the opening 64 but upon upward axial movement of the bolt its head comes into lifting engagement with the outer arm of the lever 58. This lifts the outer arm of the lever and the inner arm of the lever is swung downwardly to clamp the work piece W.

In employing the device of Figures 8 and 9, the lever 58 is first brought to the inactive position illustrated by the broken lines in Figure 8. This allows the work piece W to be arranged on the block 55 with its flange F at the front face of the block. The lever 58 is then swung to the active full line position of Figure 8. The handle 71 is then moved to rotate the cam element 59. This rotation of the cam element causes upward axial movement of the bolt 60 by reason of the action of the screw threads. Rotation of the cam 59 also produces upward movement of the bolt 60 by reason of the engagement of the cam slot walls with the pin 70. As the bolt 60 is moved by both the screw threads and the cam action, a slight rotation of the cam element results in substantial movement of the bolt. The bolt head 72 comes into lifting engagement with the lever 58 to swing the inner arm of the lever downwardly against the work piece. The final phase of rotation of the cam element 59 brings the notches 75 of the cam slots 69 into receiving relation with the pin 70. This locks the device, the action being the same as in the structure of Figures 1 to 5 inclusive, where the notches 29 receive the pin 17. It is to be observed that this locking of the device is accompanied by a final clamping action produced by the mating threads of the element 59 and bolt 60. The device exerts a known clamping pressure when in its locked position and remains positively locked until the handle 71 is moved to the released position.

The device is released by merely swinging the handle 71 to rotate the cam element 59. This rotation brings about a rapid downward axial movement of the bolt 60 by reason of the cooperating screw threads and the cam slots engaging with the pin 70. Upon retraction of the bolt 60, the lever 58 may be swung to its inactive position to be clear of the work piece. It is to be understood that a plurality of the devices may be employed on the jig. The clamps of Figures 8 and 9 are particularly adapted for use on jigs and fixtures where it is desired to leave the upper surface of the work piece exposed.

It will be apparent that the clamping and securing devices of the invention may be employed on many types of jigs and fixtures. Further, the devices are useful in connection with closures such as doors, hatches, port hole closures, etc., where it is desired to provide for a rapid, positive holding action. The invention may be embodied in forms for use as releasable hold-down means, for example; for securing furniture, machines, etc., to floors.

Having described only typical forms of the invention, I do not wish to be limited to the specific details herein set forth, but wish to reserve to myself any variations or modifications that may appear to those skilled in the art or fall within the scope of the following claims.

I claim:

1. A clamping and securing device comprising two elements normally related for relative rotation, one a screw, the other a part having a thread mating with the screw so that rotation of the part relative to the screw produces relative axial movement between the elements, a clamping and securing member actuated by relative axial movement between the elements, and cam means operated by said rotation of said part to produce actuation of said member in the same direction as that produced by said thread, the cam means including a part non-rotatable with respect to the first named part, said parts having cooperating cam faces, said faces being formed and related to lock the elements against retrograde axial movement during the final rotation of the first named part which final rotation causes the thread to produce said relative axial movement whereby the member is finally actuated as said parts are locked.

2. A clamping and securing device comprising two elements normally related for relative rotation, one a screw, the other a part having a thread mating with the screw so that rotation of the part relative to the screw produces relative axial movement between the elements, a clamping and securing member actuated by relative axial movement between the elements, and cam means operated by said rotation of said part to produce actuation of said member in the same direction as that produced by said thread, the cam means including a part non-rotatable with respect to the first named part, one of said parts having a cam slot terminating in a notch, the other part having a pin engaging in the slot and engageable in the notch at the completion of said rotation to lock the elements against retrograde axial movement during the final rotation of the first named part which final rotation causes the thread to produce said relative axial movement to finally actuate the member as said parts are locked.

3. In clamp means, two elements normally related for relative rotation, one a screw, the other a cam having a thread mating with the screw so that relative rotation of the elements produces relative axial movement of the elements, a movable clamping member, and a pin on the clamping member, the cam having a bayonet slot receiving said pin and cooperable therewith to transmit said axial movement to the member and to lock the member in its actuated position.

4. In a clamp means, a movable clamp member, a relatively stationary screw, an element arranged to be freely rotated on the screw and having a thread cooperating with the screw to be moved axially when rotated, and a part on the clamping member, the element having a cam slot cooperating with the part to transmit said axial movement of the element to the clamp member and to cause axial movement of the member and element during rotation of the element, the slot terminating in a notch which receives the part to lock the member against retrograde movement.

5. In a clamp means, a movable clamp member, a relatively stationary screw, an element arranged to be freely rotated on the screw and having a thread cooperating with the screw to be moved axially where rotated, a pin on the member, the element having a cam slot cooperating with the pin to transmit said axial movement of the element to the clamp member and to produce axial movement of the member and element in one direction during rotation of the element, the slot terminating in a notch which receives the pin to releasably lock the element and member against retrograde movement, and spring means yieldingly urging the member in the other direction.

6. In a clamp means, a movable clamp member, a relatively stationary screw, an element arranged to be freely rotated on the screw and having a thread cooperating with the screw to be moved axially where rotated, a pin on the member, the element having a cam slot cooperating with the pin to transmit said axial movement of the element to the clamp member and to produce axial movement of the member and element in one one direction during rotation of the element, the slot terminating in a notch which receives the pin to releasably lock the element and member against retrograde movement during the final screw thread advancement of the element, and a spring under compression between the pin and screw for yieldingly urging the member in the other direction.

7. In a clamp, a clamp member arranged for pivotal movement and having an opening, a stationary screw, a tubular element having threaded engagement on the screw and arranged for free rotation to be advanced along the screw, the element being received in said opening and having cam slots each terminating in a notch, and a pin on the member passing through said opening and cooperable with the slots to transmit the axial screw thread advancement of the element to the member and operable by the slots to cause axial movement of the member in the same direction, the notches being adapted to receive the pin to releasably lock the member against retrograde movement.

8. In a clamp means, a movable clamp member, a relatively stationary screw, an element arranged for free rotation and having a thread cooperating with the screw to be moved axially where rotated, a pin on the member, the element having a cam slot cooperating with the pin to transmit said axial movement of the element to the clamp member and to produce axial movement of the member and element in the same direction during rotation of the element, the slot terminating in a notch which receives the pin to releasably lock the element and member against retrograde movement, and means supporting the screw for axial adjustment.

9. In a device of the character described, a rotatable clamp member having an opening, a stationary screw, an element threaded on the screw and extending through said opening, the element being freely rotatable for advancement along the screw, a part on the member in the opening, and a cam face on the element cooperable with said part to transmit said advancement of the element to the member and operable to produce movement of the member in the same direction when the element is rotated, said movement of the member being substantially normal to the plane in which the member rotates, the engagement of the cam face with the part being operable to turn the member between inactive and active positions.

10. In a device of the character described, a clamp member having an opening, a stationary screw, an element threaded on the screw and extending through said opening, the element being rotatable for advancement along the screw, a part on the member in the opening, a cam face on the element cooperable with said part to transmit said advancement of the element to the member and operable to produce movement of the member in the same direction when the element is rotated, said movement of the member being substantially normal to the plane in which the member rotates, the engagement of the cam face with the part being operable to turn the member between inactive and active positions, and means for limiting turning of the member to stop it in said positions.

11. In a device of the character described, a clamp member supported for pivotal movement, an axially movable screw for pivoting said member, means for holding the screw against rotation, a fixed abutment, and a rotatable element having a cam face engaging said abutment to be advanced longitudinally thereby upon being rotated and having a thread cooperating with the thread of the screw so that the screw is moved axially by both the action of the cam face and the abutment and the action of the screw threads.

12. In a device of the character described, a clamp member supported for pivotal movement, an axially movable screw for pivoting said member, means for holding the screw against rotation, a fixed abutment, and a rotatable element having a thread cooperating with the screw to move the screw axially when rotated and having a cam slot cooperating with the abutment to move the element and screw axially in the same direction so that the member is pivoted both by the action of the screw threads and the cam slot, the cam slot terminating in a shoulder adapted to engage the abutment to releasably lock the element against retrograde movement.

13. A device of the character described comprising a normally rotatable element, a non-rotatable element, cooperating screw threads on the elements, a member adapted to be actuated by the relative axial movement between said elements produced by the cooperation of said threads upon rotation of the rotatable element, and cam means operated by such rotation of the rotatable element to produce actuation of said member in the same direction as produced by said cooperation of the threads and then releasably lock said rotatable element against retrograde rotation.

14. A device of the character described comprising a normally freely rotatable element, a non-rotatable element, cooperating screw threads on the elements, a member adapted to be actuated by the relative axial movement between said elements produced by the cooperation of said threads upon rotation of the rotatable element, and cam means operated by such rotation of the rotatable element to produce actuation of said member and then releasably lock said rotatable element against retrograde rotation, the cam means including a cam surface on the rotatable element terminating at one end in a notch, and a relatively non-rotatable part connected with said member and cooperating with the cam surface during said rotation of the rotatable element and engageable in said notch during the final stage of said rotation to lock the rotatable element against retrograde rotation, said threads cooperating during said final stage of rotation to continue actuation of said member.

15. A clamping device comprising a clamping member, cam means for actuating said member including a relatively non-rotatable element, a normally rotatable element, a cam face on one element terminating at one end in a notch, a part on the other element cooperable with the cam face to actuate the clamping member during rotation of the rotatable element and to engage in said notch during the final phase of such rotation to lock the rotatable element against retrograde rotation, and screw thread means operated by said final phase of rotation of said rotatable element for further actuating the clamping member simultaneously with said locking of the rotatable element.

JOHN P. COOKE.